(12) United States Patent
Huck et al.

(10) Patent No.: US 12,450,499 B2
(45) Date of Patent: Oct. 21, 2025

(54) SCRIPT ANALYTICS TO GENERATE QUALITY SCORE AND REPORT

(71) Applicant: Disney Enterprises, Inc., Burbank, CA (US)

(72) Inventors: Lori L. Huck, Los Angeles, CA (US); Alexis L. Johnson, La Crescenta, CA (US); Mara I. Lucien, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1007 days.

(21) Appl. No.: 17/035,348

(22) Filed: Sep. 28, 2020

(65) Prior Publication Data
US 2022/0101157 A1     Mar. 31, 2022

(51) Int. Cl.
*G06N 5/04* (2023.01)
*G06F 40/289* (2020.01)
*G06N 20/00* (2019.01)
*G06Q 10/0637* (2023.01)
*G06Q 10/0639* (2023.01)
*G06Q 10/101* (2023.01)

(52) U.S. Cl.
CPC ............ *G06N 5/04* (2013.01); *G06F 40/289* (2020.01); *G06N 20/00* (2019.01); *G06Q 10/06375* (2013.01); *G06Q 10/06395* (2013.01); *G06Q 10/101* (2013.01)

(58) Field of Classification Search
CPC ........ G06N 5/04; G06N 20/00; G06F 40/289; G06Q 10/06375; G06Q 10/06395; G06Q 10/101

USPC .......................................................... 706/12
See application file for complete search history.

(56) References Cited

U.S. PATENT DOCUMENTS

| | | | |
|---|---|---|---|
| 11,568,301 B1 * | 1/2023 | Yueh | G06N 20/00 |
| 2013/0311408 A1 * | 11/2013 | Bagga | G06Q 30/02 |
| | | | 706/12 |
| 2017/0017644 A1 * | 1/2017 | Accardo | G06F 16/285 |
| 2017/0132528 A1 * | 5/2017 | Aslan | G06N 20/00 |
| 2017/0300748 A1 * | 10/2017 | Austin | G06F 40/284 |
| 2018/0165696 A1 * | 6/2018 | Bessen | G06F 40/279 |
| 2019/0311022 A1 * | 10/2019 | Fan | G06F 40/166 |
| 2019/0318202 A1 * | 10/2019 | Zhao | G06F 18/214 |
| 2020/0372524 A1 * | 11/2020 | Srivastava | G06F 40/20 |

OTHER PUBLICATIONS

Leike, Jan. Learning Through Human Feedback. Jun. 12, 2017, www.deepmind.com/blog/learning-through-human-feedback. (Year: 2017).*
Maximizing Your Success. (n.d.). Retreived Oct. 1, 2020, from http:www.cinelytic.com/.
"Predict the Future Today," Vault, Retrieved Oct. 1, 2020, www.vault-ai.com/.
Storyfit. "AI for the Entertainment Industry," Storyfit, Retreived Oct. 1, 2020, www.storyfit.com.

* cited by examiner

*Primary Examiner* — Stephen S Hong
*Assistant Examiner* — Broderick C Anderson
(74) *Attorney, Agent, or Firm* — Dorsey & Whitney LLP

(57) ABSTRACT

Embodiments provide for evaluation of scripts. A script for producing media content is received, and a plurality of tags related to content of the script is determined. A quality score is generated for the script by processing the plurality of tags using a first model, and one or more modifications for the script are generated based on the quality score and the plurality of tags.

20 Claims, 5 Drawing Sheets

SCRIPT ANALYTICS TO GENERATE QUALITY SCORE AND REPORT

BACKGROUND

Studios, networks, and streaming services expend significant resources in acquiring, developing, and/or rewriting scripts before actually producing media (e.g., filming and editing video) based on the "finished" script. A variety of techniques can be applied to attempt to ensure the resulting media will be successful. For example, media producers often consider factors including distribution plans and marketing for the media, as well as script-specific factors like what genres or actors are popular. However, these considerations are inherently subjective and imprecise, and existing approaches do not provide any cohesive and objective way to predict success (or failure) at early stages, especially at the script-level on which the media is based.

SUMMARY

According to one embodiment of the present disclosure, a method is provided. The method comprises: receiving a script for producing media content; determining a plurality of tags related to content of the script; generating a quality score for the script by processing the plurality of tags using a first model; and generating, based on the quality score and the plurality of tags, one or more modifications for the script.

According to one embodiment of the present disclosure, a non-transitory computer-readable medium containing computer program code is provided. The computer code, when executed by operation of one or more computer processors, performs an operation comprises: receiving a script for producing media content; determining a plurality of tags related to content of the script; generating a quality score for the script by processing the plurality of tags using a first model; and generating, based on the quality score and the plurality of tags, one or more modifications for the script.

According to one embodiment of the present disclosure, a system is provided. The system comprises one or more computer processors and a memory containing a program which when executed by the one or more computer processors performs an operation. The operation comprises: receiving a script for producing media content; determining a plurality of tags related to content of the script; generating a quality score for the script by processing the plurality of tags using a first model; and generating, based on the quality score and the plurality of tags, one or more modifications for the script.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Figure 1:
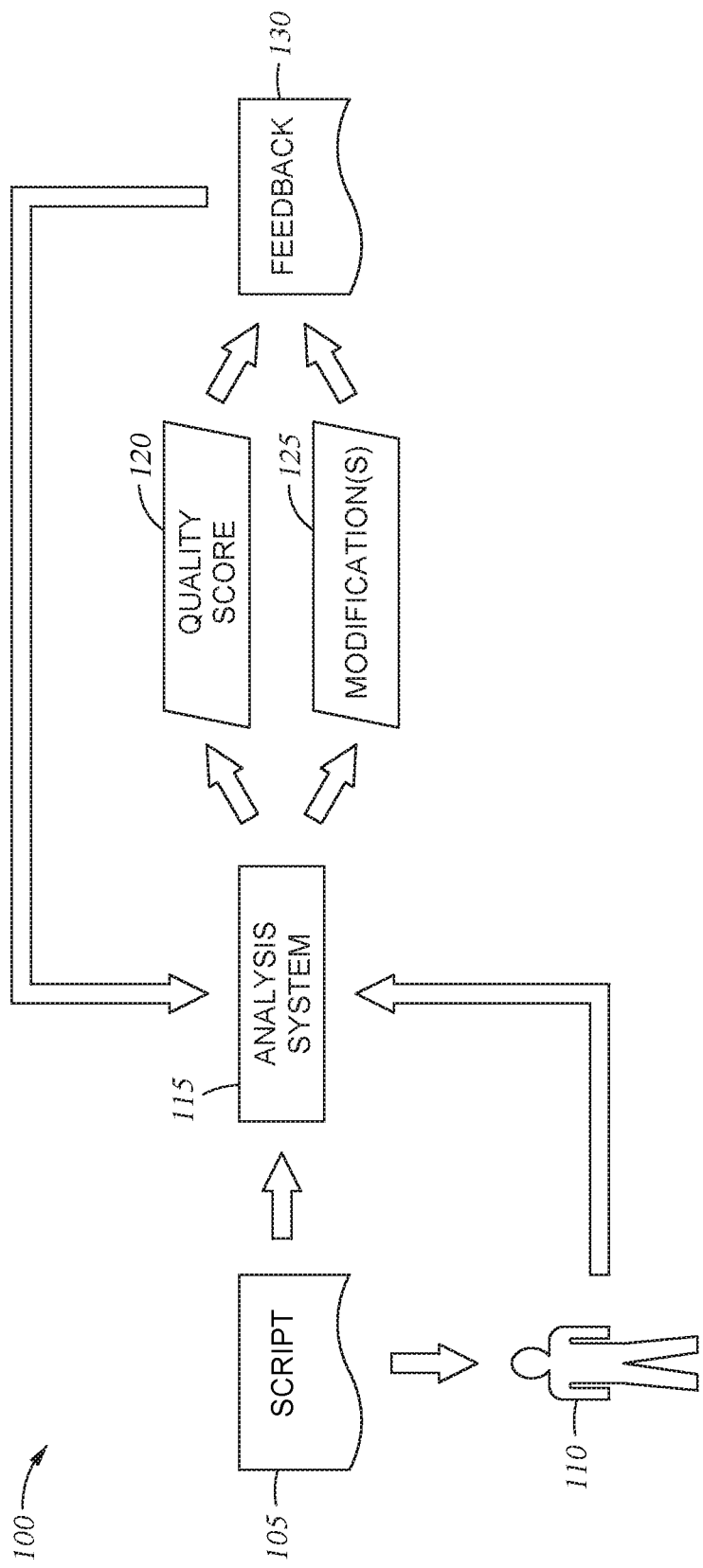
FIG. 1 depicts a system configured to generate quality scores and proposed modifications for scripts based on learned models, as well as to receive feedback and revise the models, according to some embodiments disclosed herein.

Embodiments of the present disclosure provide techniques and systems to objectively evaluate scripts in order to generate quality scores, as well as to generate specific, concrete, and actionable proposals to modify the script in order to improve its quality and in turn, translate into improved produced media. This can allow various scripts and rewrites to be empirically analyzed at early stages (e.g., before production begins) in order to minimize resource expenditure on media that may fail. In embodiments, this reduced expenditure can include less time wasted, less monetary investment, and less expenditure of any other resource involved in producing media.

In some embodiments, this analysis relies on script tags (either generated using machine learning, provided by human users, or a combination of machine learning and human effort) relating to concepts such as plot devices, character archetypes, dialogue breakdowns according to various factors (e.g., the identity, including but not limited to the race, ethnicity, and/or the gender, of the character delivering each line), and the like. This allows systems described herein to generate data-forward reports and scores for each script, and to further generate data-backed and specific proposals for producers and writers to improve the script, in order to improve the likelihood that the resulting media will be successful.

In some embodiments, the generated score is compared to one or more thresholds to predict the strength (also referred to as quality) of the script. For example, a score of eighty or higher may be associated with a structurally-strong script, while lower scores indicate structural problems that may harm the success of the resulting media. In one embodiment, the factors considered when generating a score for a given script include, by way of example and without limitation, character archetypes in the script (e.g., villains, heroes, love interests, rebels, and the like), a breakdown of the characteristics of each character (e.g., by gender, race, ethnicity, age, sexual orientation, ability/disability, culture, personality, and other character elements), and dialogue statistics (e.g., the overall number of lines in the script, the number of lines per-character, the number of lines spoken by each gender, and the like).

In at least one embodiment, the factors considered when generating the score for a script can also include the number, timing, and types of plot devices included. A plot device is generally a narrative technique used to influence or move the narrative plot forward. In some embodiments of the present disclosure, the plot devices considered may include, without limitation, character reveals, audience reveals, reversals, cliffhangers, and the like. As used herein, a character reveal generally refers to so-called "game changer" information that is revealed to one or more characters which defies the character(s) pre-established expectations, filling in a gap in the one or more characters' knowledge. Relatedly, an audience reveal is information revealed that defies the audience or viewer's pre-established expectations (e.g., information that was previously withheld from the audience). As used herein, a reversal is a dramatic plot or emotional shift within a scene that "reverses" or "twists" the narrative trajectory in a new or unforeseen direction. Further, as used herein, a cliffhanger is a strong element of suspense that makes the audience or viewer wait for the answer (e.g., a shocking revelation that withholds a resolution). These are used often at the end of an act in episodic scripts.

In some embodiments, the various tags are compared against defined ranges or values in order to generate an overall quality score. For example, the number of plot devices may be compared against a predefined optimal range (e.g., forty to seventy during a single episode of a standard drama) in order to generate the score. That is, too few plot devices may indicate a boring script, while too many indicates an overly-busy or overly-complex script. In at least one embodiment, an algorithm is used to compute the quality score (e.g., with each factor being assigned a weight to generate the overall score). For example, if five factors are used, each may be assigned equal weight (e.g., 20% of the overall score) or unequal weights. Similarly, in some embodiments, the system considers not only the presence (or absence) of tags, but also their location/pacing in the script. For example, plot devices in the first or last segments of the script may be assigned a higher weight when calculating the script score. As used herein, a script segment can refer to any logical partition in the script, such as by scene, by act, between advertisements, and the like. In various embodiments, the particular weights may be manually defined (e.g., by a user) or may be automatically determined (e.g., by learning from previous scripts of known quality).

In at least one embodiment, the system utilizes trained machine learning models to generate quality scores based on the input tags. In some embodiments, the analysis system can select a particular model or algorithm based, at least in part, on various aspects of the input script such as the genre, the planned delivery method (e.g., streaming, screened in theaters, broadcast on television, and the like), the planned delivery mode (e.g., the platform or network that will provide the media to viewers), and the like. This allows the system to analyze each script objectively and in view of the broader context or plan for the media. In at least one embodiment, the script quality score and recommendations, and thus predictions about the success or failure of the script, are generated prior to the script actually being used to produce any media (e.g., a pilot episode or any other episode, or before a movie or one or more specific scenes in the movie). This allows the improvements to be made at the outset, and reduces the time and expense of the process.

FIG. 1 depicts a System 100 configured to generate quality scores and proposed modifications for scripts based on learned models, as well as to receive feedback and revise the models, according to some embodiments disclosed herein. In the illustrated embodiment, a Script 105 is received by an Analysis System 115. In embodiments, the Script 105 is an electronic version of a textual document that can be used to produce media (e.g., a digital text document, a scanned version of a physical copy, and the like). For example, the Script 105 may specify dialogue lines, characters present in each scene, the staging or arrangement of each scene, the number of acts or segments in the script, and the like.

In the illustrated embodiment, the Script 105 is also provided to one or more human Users 110 that perform some of the tagging. In the illustrated embodiment, the Users 110 may tag story-centric elements of the Script 105, such as the plot devices and the character archetypes that are included. In one embodiment, these tags specify the location in the Script 105 where the element occurs and identify what the element is. In some embodiments, rather than utilizing human taggers, all of the tagging is performed automatically (e.g., using trained machine learning models), such that the script need not be provided to human Users 110 to generate tags. If human tagging is performed, these tags are provided to the Analysis System 115 along with the Script 105.

As illustrated, the Analysis System 115 evaluates the Script 105 (and any provided tags) to generate a Quality Score 120 and a set of zero or more proposed Modifications 125. In some embodiments, the Analysis System 115 parses the Script 105 to generate one or more tags. In one embodiment, the Analysis System 115 determines the number of lines or words spoken by each character in the Script 105 to generate tags relating to various values and aspects of the Script 105. For example, the Analysis System 115 may determine the gender breakdown of the Script 105 (e.g., the percentage or number of characters associated with a given gender), the diversity of the Script 105 (e.g., the number or percentage of characters associated with any particular race, ethnicity, status, or background), the number or percentage of lines (or words) spoken on a per-gender basis, and the like.

In some embodiments, the Analysis System 115 further considers the content of the dialogue. For example, using natural language processing (NLP), the Analysis System 115 may determine whether or not certain topics are included in any given scene. In at least one embodiment, NLP is utilized to analyze the complexity of the dialogue in the script (collectively for all lines, or on a character-by-character basis). These and other examples provided in the present disclosure are intended merely as illustrations for conceptual clarity, and any number and variety of tags and concepts may be utilized to generate the quality score.

In embodiments, the Analysis System 115 processes the tags (e.g., the values reflected in each tag) using one or more models. In one embodiment, the models can include trained machine learning model(s). In some embodiments, the models include algorithm(s). In still another embodiment, the models can include set(s) of rules. Generally, the model(s) output an overall Quality Score 120 when given a set of tags as input(s). In some embodiments, the Quality Score 120 may be a numerical value (e.g., from zero to one hundred, from zero to ten, or any other numerical range). In other embodiments, the Quality Score 120 may include a letter grade (e.g., A through F) or any other suitable measure. In some embodiments, the range of "good" Quality Scores 120 may not encompass either extreme on the spectrum. For example, for scripts scored from zero to ten, the target "good" level may be scores seven or eight. In embodiments, the range of a "good" script may be configured manually and/or determined automatically (e.g., by learning from previous scripts).

In the illustrated embodiment, the Analysis System 115 also generates a set of zero or more proposed Modifications 125. In some embodiments, the Analysis System 115 determines whether to generate Modifications 125 based on comparing the Quality Score 120 to one or more thresholds. That is, if the Quality Score 120 meets or exceeds a predefined minimum threshold, the Analysis System 115 may refrain from generating any Modifications 125. In at least one embodiment, the Analysis System 115 compares the Quality Score 120 to a predefined range (e.g., from eighty to ninety-two) and only generates Modifications 125 if the Quality Score 120 falls above or below the range.

In an embodiment, the Modifications 125 are specific actions that can be used to revise the Script 105 in order to improve its Quality Score 120. For example, if the Analysis System 115 determines that the number of plot devices is too high or low (as determined using the model), a Modification 125 may specify to add (or remove) one or more plot devices. Similarly, if the Analysis System 115 determines that the percentage of lines or words spoken by a particular gender is too high or low, the Analysis System 115 may suggest that the writers add more lines to be spoken by characters of a gender different from the identified gender (or remove lines spoken by characters of the identified gender).

In some embodiments, the Modifications 125 may include recommendations with respect to how the media should be delivered. For example, one Modification 125 may suggest a particular delivery mode or platform in order to improve the probability of success.

Advantageously, these concrete Modifications 125 can be easily used to revise the Script 105. Additionally, because the Analysis System 115 is able to provide evidenced-backed data showing exactly what went into calculating the Quality Score 120, users can readily understand where the Script 105 excels and fails. Further, because the Analysis System 115 utilizes objective criteria and predefined models, the Script 105 can be compared against other Scripts 105 (e.g., for media content that has already been produced and released) in order to identify which other content is most structurally-similar.

In the illustrated embodiment, the Analysis System 115 may receive Feedback 130 based on the Quality Score 120 and Modifications 125. For example, a user may provide Feedback 130 that one or more Modifications 125 are accepted or rejected, or that the weights of the various factors should be refined or modified. In at least one embodiment, based on the subsequent performance of the produced media, a user can indicate the quality of the script (e.g., whether the script was successful or not). Based on this Feedback 130, the Analysis System 115 can refine its models. This may include, for example, refining machine learning models, adjusting predefined thresholds and criteria used by one or more algorithms or rules to generate Quality Scores 120, and the like. In some embodiments, after media produced based on the Script 105 is released, the Feedback 130 can include indications as to how successful or popular the media is. In at least one embodiment, the Feedback 130 indicates the success or popularity of the media with respect to specific delivery modes, platforms, or formats (e.g., streaming, broadcast, and the like). The Feedback 130 can allow the Analysis System 115 to refine its models to generate more accurate scores in the future.

Figure 2:
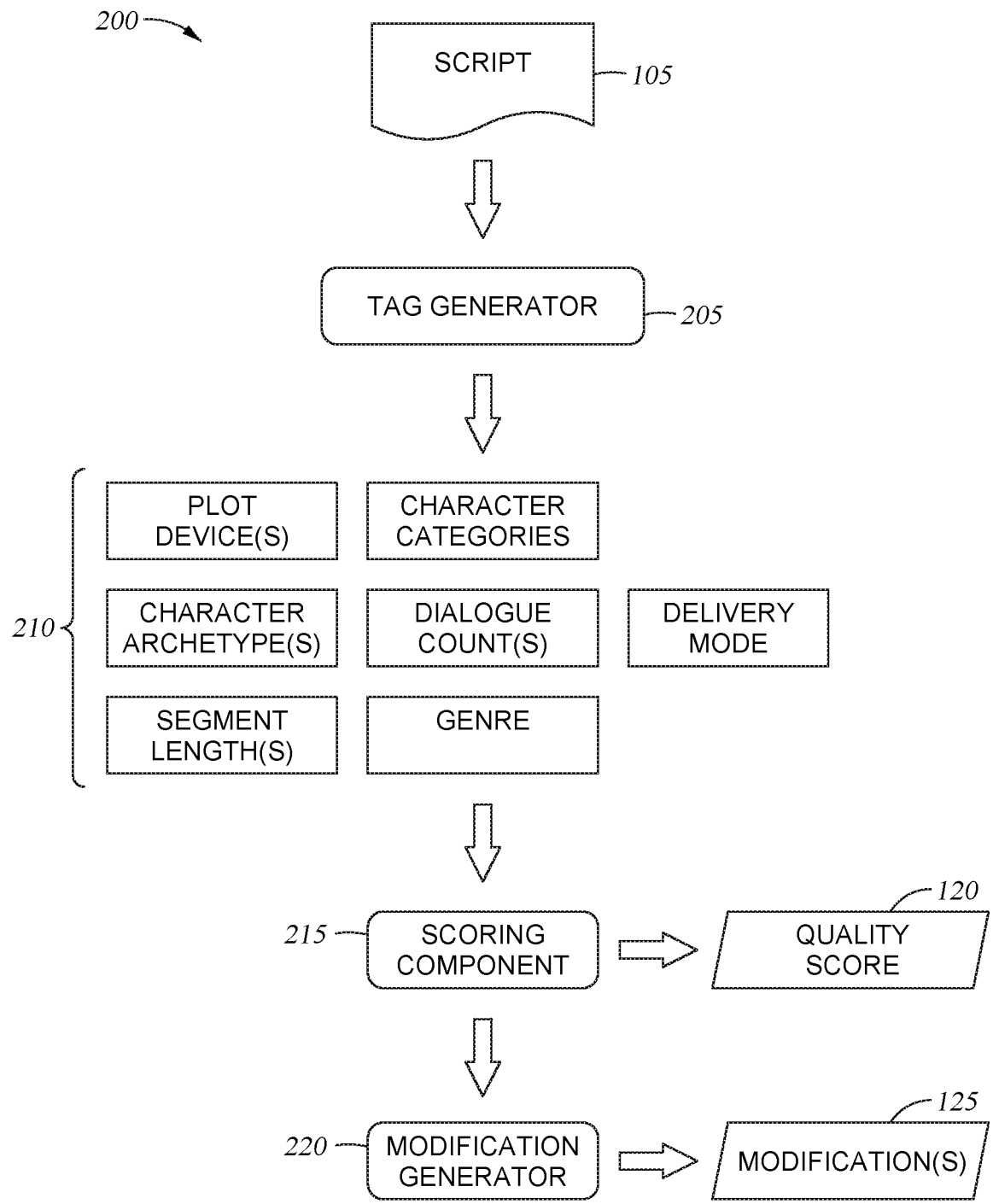
FIG. 2 illustrates a workflow for evaluating scripts to generate quality scores and proposed modifications to improve the script quality, according to some embodiments disclosed herein.

FIG. 2 illustrates a Workflow 200 for evaluating scripts to generate quality scores and proposed modifications to improve the script quality, according to some embodiments disclosed herein. The illustrated embodiment includes a Tag Generator 205, Scoring Component 215, and Modification Generator 220. Although these discrete components are illustrated for conceptual clarity to aid understanding, the operations and functionality may be combined or distributed across any number and variety of components.

In the depicted Workflow 200, a Script 105 is evaluated by a Tag Generator 205 to generate a set of Tags 210. In one embodiment, the Tag Generator 205 includes one or more machine learning models trained to identify and tag various elements of the Script 105, such as plot devices, character types, dialogue counts and distributions, and the like. In some embodiments one or more of the Tags 210 are generated by human taggers.

In the illustrated embodiment, the Tags 210 relate to any number and variety of structural elements in the Script 105. In some embodiments, if the Script 105 is delineated into logical segments (e.g., acts, time between commercial breaks, and the like), some or all of the Tags 210 are defined on a per-segment basis. For example, in addition to (or instead of) indicating the total number of plot devices, the Tags 210 may indicate the number of plot devices included in each segment of the Script 105. This can allow the Analysis System 115 to generate quality scores based not only on the presence or absence of elements, but also on their pacing and location in the Script 105.

In the illustrated embodiment, the Tags 210 indicate plot devices, character archetypes, character categories, dialogue counts, delivery mode, segment lengths, and genre of the Script 105. Although the illustrated embodiment includes the seven depicted Tags 210, in embodiments, any number and variety of tags (including additional tags not listed here) may be used. The plot device Tag(s) 210 generally indicate the presence of one or more devices specified in a predefined list. For example, the plot device Tag(s) 210 may indicate character reveals, audience reveals, reversals, cliffhangers, and the like. In at least one embodiment, a user may select which Tags 210 they wish to generate for the Script 105. For example, a user may interact with one or more toggles to select which categories of tags should be generated, and which should be ignored for the Script 105.

In an embodiment, character archetype Tag(s) 210 generally indicate the presence of one or more archetypes specified in a predefined list. For example, the character archetype Tag(s) 210 may indicate the presence of a hero character, a villain, a love interest, a rebel, a nurturer, and the like. The character category Tag(s) 210 generally indicate the ratios or proportions of various characteristics for the characters in the Script 105. For example, the character categories may indicate the number or percentage of characters associated with a given gender, age, profession, race, ethnicity, sexual orientation, or any suitable category. In some embodiments, the dialogue count(s) Tag(s) 210 indicate the number or percentage of lines or words spoken by each category of character, as indicated by the character categories Tags 210.

In an embodiment, the delivery mode Tag(s) 210 indicate the method of media delivery that will be used (e.g., streaming or television) and/or the venue for delivery (e.g., the particular network or streaming service that will host it). The segment length Tag(s) 210 generally indicate the length of each section in the Script 105, as well as the overall length of the Script 105. The genre Tag 210 indicates the genre of the Script 105 (e.g., drama or comedy). In at least one embodiment, the Tag(s) 210 for delivery mode and/or genre are used to help select which model(s) to utilize when generating the Quality Score 120 for the Script 105.

In the illustrated embodiment, the Tags 210 are received by a Scoring Component 215 that generates a Quality Score 120. In some embodiments, as discussed above, the Scoring Component 215 uses one or more of the Tags 210 to select which model(s) should be used. For example, based on the genre, delivery mode, or other factors, the Scoring Component 215 may determine which model should be used to generate the Quality Score 120. That is, in an embodiment, the system may maintain a set of models, rather than a single model, such that a particular model can be selected for particular scripts, as appropriate. In such an embodiment, the Scoring Component 215 may utilize one or more specific models (or sets of parameters or weights) from a larger set of models (or a set of different parameters or weights) for any given Script 105.

In one embodiment, the models include one or more machine learning models that have been trained to generate Quality Scores 120 given a set of input Tags 210. In some embodiments, to train a machine learning model, a set of example Scripts 105 with associated Quality Scores 120 (e.g., specified by a subject matter expert, or computed based on the popularity or success of the resulting media). These scores can be used as target output to refine the models when given the Script 105 (or the associated Tags 210) as input.

In some embodiments, the models include one or more algorithms or sets of rules. In one embodiment, a set of predefined criteria (e.g., values or thresholds) may be used to compute a value or score for each category of Tag 210, and these can be combined to yield an overall Quality Score 120. For example, the plot device Tag(s) 210 may be evaluated against criteria relating to the number or pacing of the devices in the Script 105 in order to generate part of the Quality Score 120. Similarly, the character category Tag(s) 210 may be evaluated against criteria relating to a preferred or optimal ratio.

In the illustrated embodiment, the Modification Generator 220 generates proposed Modifications 125 for the Script 105 based on the Quality Score 120 and/or Tags 210. For example, if the Quality Score 120 falls outside of a predefined range, the Modification Generator 220 may generate proposed Modifications 125 to bring the Quality Score 120 into the range. In one embodiment, the Modification Generator 220 does so by identifying elements that can be added, removed, moved to a different segment, or changed in some other way in order to change the Quality Score 120. For example, if the Scoring Component 215 determines that there are too few lines spoken by a given category of character, the Modification Generator 220 may suggest that more lines be added for characters in that category. In at least one embodiment, some or all of the Modifications 125 are automatically implemented by the system.

Figure 3:
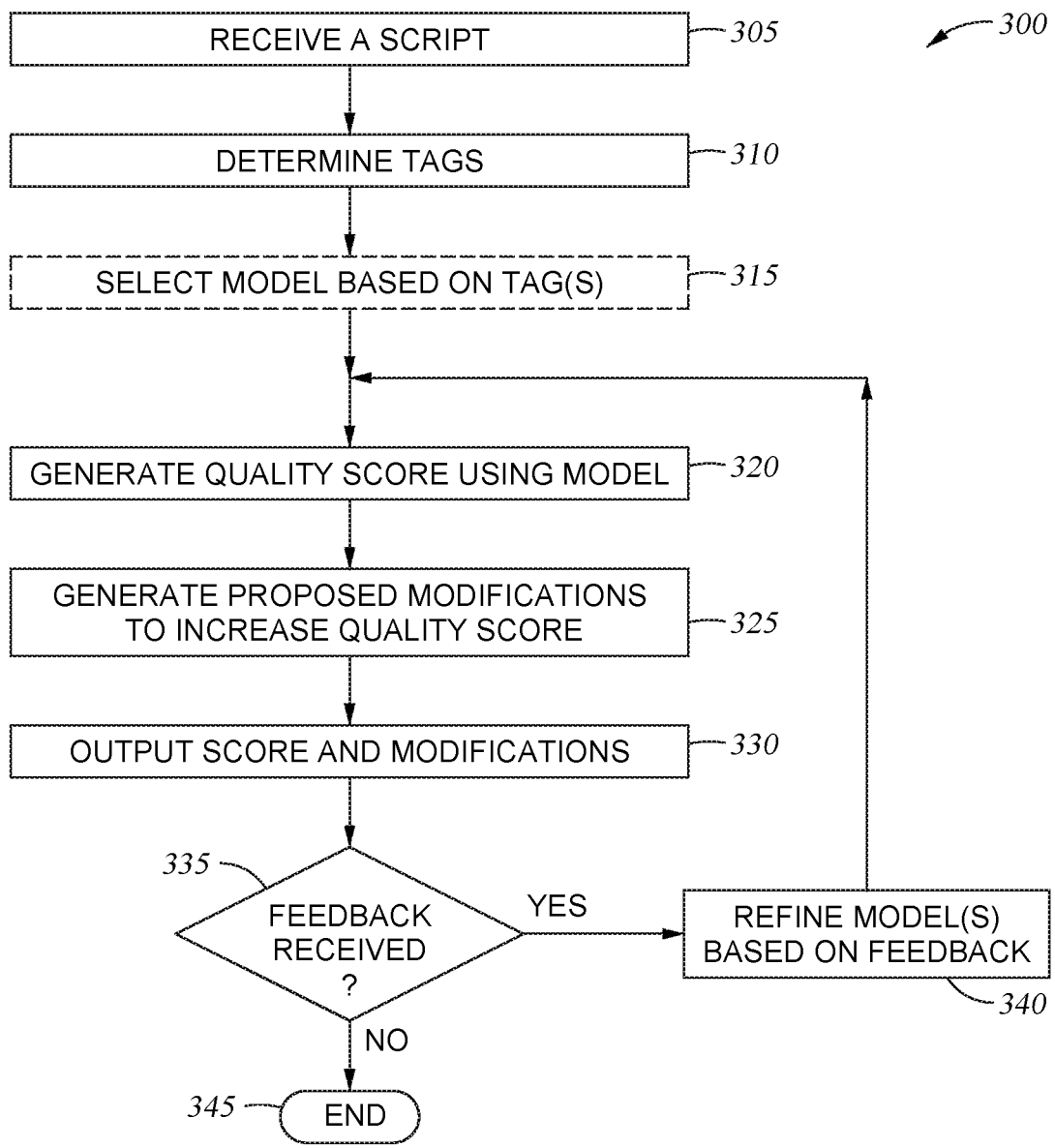
FIG. 3 is a flow diagram illustrating a method for evaluating scripts to generate quality scores and modifications, according to some embodiments disclosed herein.

FIG. 3 is a flow diagram illustrating a method 300 for evaluating scripts to generate quality scores and proposed modifications, according to some embodiments disclosed herein. Although textual scripts are described in the illustrated embodiment, in some embodiments, non-textual scripts may be received. For example, the system may receive a recording of a script, and generate a text transcription. Similarly, the system may receive one or more digital images of the script, and utilize optical character recognition (OCR) to generate a textual script. The method 300 begins at block 305, where an analysis component (e.g., the Analysis System 115) receives a script for evaluation. At block 310, the analysis component determines tags for the script. In some embodiments, this includes identifying tags provided by human users. In some embodiments, this includes parsing the script using one or more machine learning models to tag elements in the script. In at least one embodiment, the analysis component utilizes a hybrid of automatic and manually-curated tags.

At block 315, the analysis component selects a model based on the determined tags. As discussed above, in some embodiments, the analysis component can utilize different models (or different weights, parameters, or criteria) based on the tags. For example, comedy scripts may be evaluated using a first model, while dramas may be evaluated using a second model different from the first model. Similarly, media for a first network may be evaluated using a first model, while media destined for a different network (or a streaming system) may be evaluated using a second model different from the first model. In some embodiments, however, block 315 is optional and bypassed (i.e., the analysis component uses a single model for all input scripts).

The method 300 then continues to block 320, where the analysis component generates a quality score for the script by processing the determined tags using the selected model(s). In some embodiments, this includes generating a sub-score for one or more categories of tags (e.g., an "archetype" category, a "plot device" category, and the like), and aggregating these sub-scores to generate an overall quality score. In some embodiments, rather than utilizing entirely separate models for differing genres, the analysis component can utilize the same algorithms or rules, but apply different criteria or thresholds for each category. For example, the system may specify a target of fifty plot devices in comedy scripts, and a target of seventy-five plot devices for drama scripts.

Once the quality score is generated, the method 300 continues to block 325, where the analysis component generates zero or more proposed modifications for the script in order to increase the quality score. In some embodiments, if the original quality score is above a predefined threshold (or within a predefined range), the analysis component refrains from generating proposed modifications. In an embodiment, each proposed modification is generated based on the determined tags, and provides specific and actionable suggestions that will increase the score of the script. For example, the modifications may specify to shorten or lengthen one or more parts (e.g., acts in the script), to add or remove one or more lines of dialogue, to add or remove one or more characters or archetypes, to add or remove one or more plot devices, and the like.

The method 300 then continues to block 330, where the score and modifications are output. For example, the system may output the score and/or modifications on a graphical user interface (GUI). In embodiments, the score and modifications may be output simultaneously (e.g., in parallel) or sequentially. In at least one embodiment, the system may first output the generated score, and subsequently output the modifications (simultaneously or in sequence). For example, the system may initially output the score, and only output proposed modifications if a user requests they be displayed.

The method 300 then continues to block 335, where the analysis component determines whether feedback relating to the quality score and/or modifications has been received. If not, the method 300 terminates at block 345. If feedback has been received, the method 300 continues to block 340, where the analysis component refines the model(s) it used to generate the quality score and/or modifications, based on the feedback. For example, if the feedback indicates that the quality score is too high or low, the analysis component may refine the models (e.g., by modifying the criteria or weights used to calculate the score). The method 300 then returns to block 320, such that an updated quality score can be generated using the refined model(s).

Figure 4:
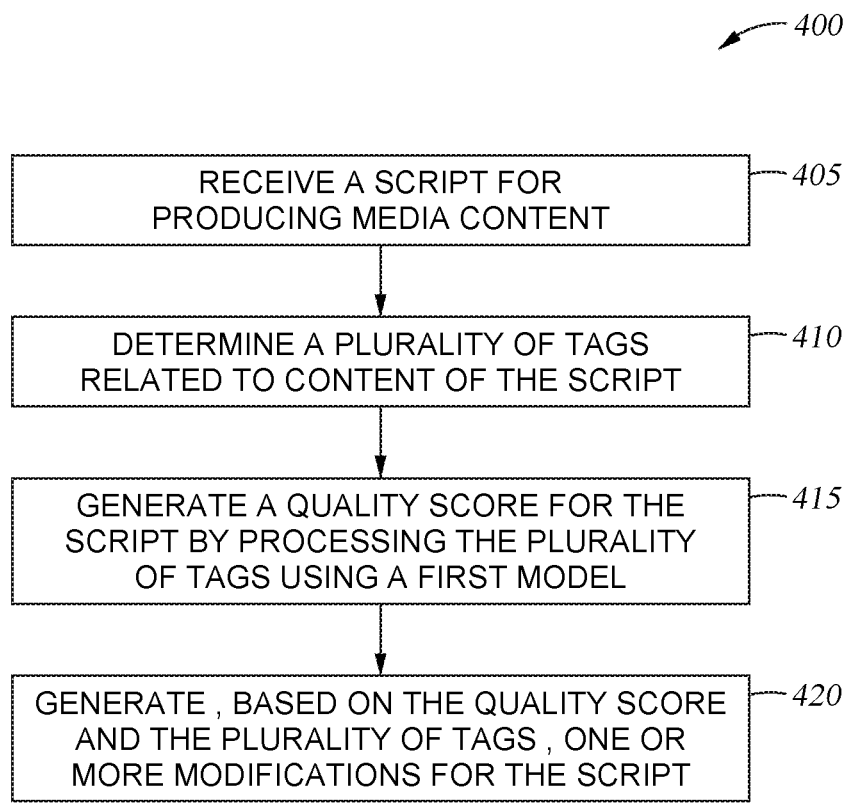
FIG. 4 is a flow diagram illustrating a method for evaluating scripts to generate quality scores and modifications, according to some embodiments disclosed herein.

FIG. 4 is a flow diagram illustrating a method 400 for evaluating scripts to generate quality scores and proposed modifications, according to some embodiments disclosed herein. The method 400 begins at block 405, where an analysis component (e.g., the Analysis System 115) receives a script for producing media content. At block 410, the analysis system determines a plurality of tags related to content of the script. The method 400 then continues to block 415, where the analysis system generates a quality score for the script by processing the plurality of tags using a first model. Further, at block 420, the analysis system generates, based on the quality score and the plurality of tags, one or more proposed modifications for the script.

Figure 5:
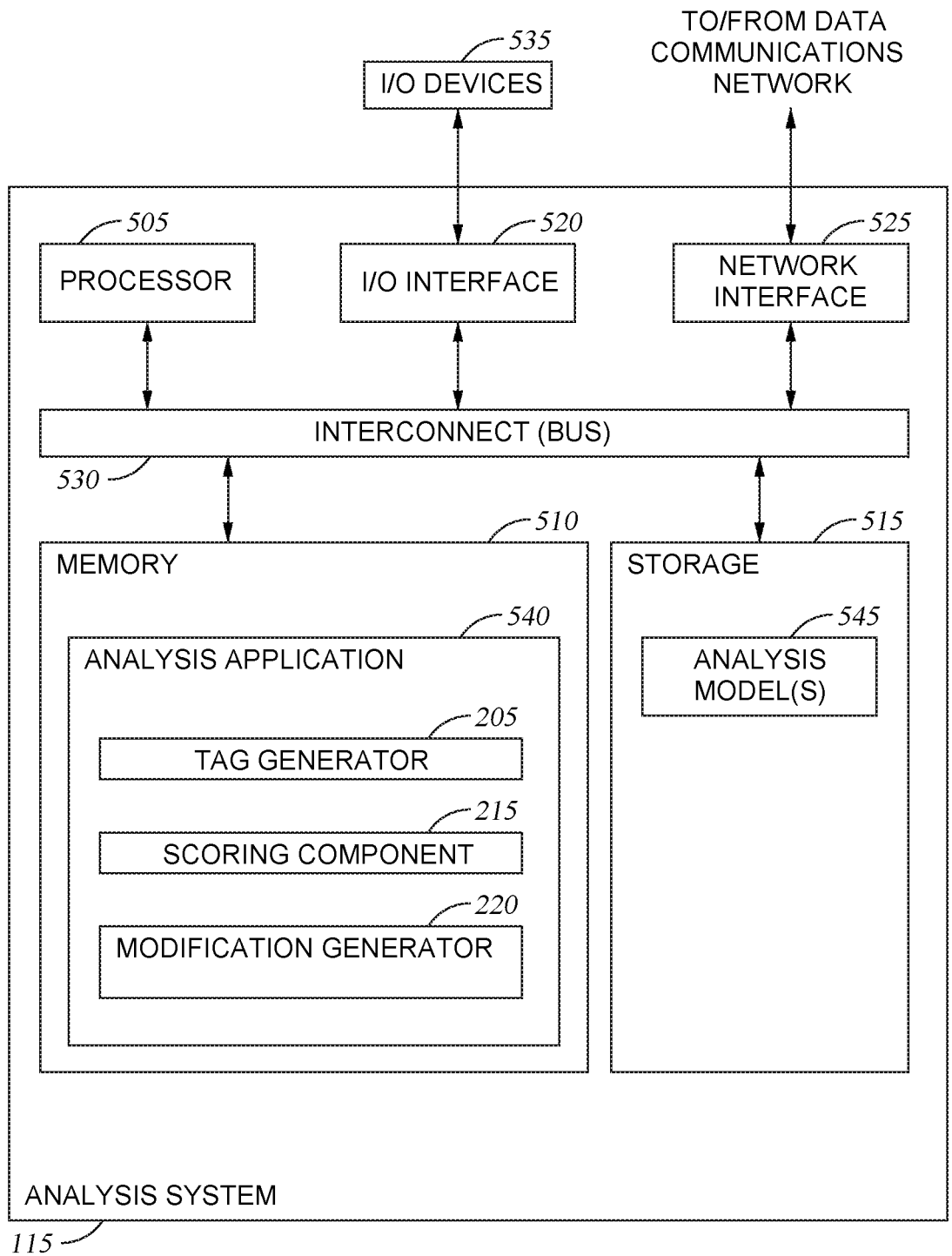
FIG. 5 is a block diagram depicting an analysis system configured to evaluate scripts to generate quality scores and modifications, according to some embodiments disclosed herein.

FIG. 5 is a block diagram depicting an Analysis System 115 configured to evaluate scripts to generate quality scores and modifications, according to some embodiments disclosed herein. Although depicted as a physical device, in embodiments, the Analysis System 115 may be implemented as a virtual device or service, or across a number of devices (e.g., in a cloud environment). As illustrated, the Analysis System 115 includes a Processor 505, Memory 510, Storage 515, I/O Interface 520, and a Network Interface 525. The components are connected by one or more Interconnects 530. In the illustrated embodiment, the Processor 505 retrieves and executes programming instructions stored in Memory 510, as well as stores and retrieves application data residing in Storage 515. The Processor 505 is generally representative of a single CPU, a GPU, a CPU and a GPU, multiple CPUs, multiple GPUs, a single CPU or GPU having multiple processing cores, and the like. The Memory 510 is generally included to be representative of a random access memory. Storage 515 may be any combination of memory or storage components, including (but not limited to) disk drives, flash-based storage devices, and the like, and may include fixed storage devices, removable storage devices or a combination both, such as fixed disk drives, removable memory cards, caches, optical storage, network attached storage (NAS), or storage area networks (SAN).

In some embodiments, I/O Devices 535 (such as a mouse, a keyboard, a monitor, a touchscreen, etc.) are connected via the I/O Interface(s) 520. Further, via the Network Interface 525, the Analysis System 115 can be communicatively coupled with one or more other devices and components (directly or indirectly), such as content servers, via one or more networks.

In the illustrated embodiment, the Storage 515 includes a set of one or more Analysis Models 545. Although depicted as residing in Storage 515, the Analysis Models 545 may reside in any suitable location. In embodiments, the Analysis Models 545 are generally used to compute quality scores based on tags for scripts. The Analysis Models 545 may include trained machine learning models, algorithms, sets of scoring rules, and the like. In some embodiments, a separate Analysis Models 545 can be selected based on one or more tags for the script, such as the genre, the network that will air it, and the like.

As illustrated, the Memory 510 includes an Analysis Application 540. Although depicted as software residing in Memory 510, in embodiments, the functionality of the Analysis Application 540 may be implemented using hardware, software, or a combination of hardware and software. The Analysis Application 540 is generally configured to perform one or more embodiments disclosed herein. In the illustrated embodiment, the Analysis Application 540 includes a Tag Generator 205, a Scoring Component 215, and a Modification Generator 220. Although depicted as discrete components for conceptual clarity, in embodiments, the operations of the Tag Generator 205, Scoring Component 215, and Modification Generator 220 may be combined or distributed across any number of components.

In an embodiment, the Tag Generator 205 generally parses the script to generate tags relating to elements in the script. In some embodiments, the Tag Generator 205 also retrieves tags created by human users. As discussed above, the tags generally relate to structural and contextual elements of the script, including the plot devices, character archetypes, character classifications or categories, number of lines or words per character category, and the like. These tags can be used to evaluate the structural strength of the script.

In the illustrated embodiment, the Scoring Component 215 evaluates the tags using one or more Analysis Models 545 in order to generate a quality score for the script. This quality score indicates the structural strength of the script, and may be used as a proxy or predictor for the potential the script has to be successful. In an embodiment, the Modification Generator 220 evaluates the tags and/or quality score to generate proposed modifications for the script in order to increase the quality score of the script.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method, comprising:
   receiving, by a processor:
      a script for producing media content,
      a plurality of tags related to content of the script, wherein the plurality of tags are generated using a first machine learning model trained to generate tags based on script elements, and wherein the script elements comprise plot devices, character types, or dialogue counts or distributions, and
      a quality score for the script generated by a second machine learning model configured to process the plurality of tags, wherein a selection of the second machine learning model is based at least in part on a genre of the script;
   outputting, by the processor and via a graphical user interface, one or more proposed modifications for the script based on the quality score and the plurality of tags;
   automatically applying the one or more proposed modifications to the script; and
   automatically refining the second machine learning model based on feedback relating to the quality of the script.

2. The method of claim 1, wherein generating the plurality of tags further comprises processing the script using one or more trained machine learning models in order to identify occurrence of one or more predefined concepts in the script.

3. The method of claim 1, further comprising receiving one or more manually-curated tags from a user, wherein the quality score is further based on the one or more manually-curated tags.

4. The method of claim 1, wherein the plurality of tags indicate at least one of:
   (i) presence of one or more plot devices in the script;
   (ii) presence of one or more character archetypes in the script;
   (iii) gender of one or more characters in the script;
   (iv) a diversity of characters in the script;
   (v) a number of lines associated with each character in the script;
   (vi) a length of the script;
   (vii) a complexity of dialogue in the script; or
   (viii) a length of one or more segments of the script.

5. The method of claim 1, wherein the one or more proposed modifications are generated responsive to comparing the quality score to a threshold quality score, and wherein generating the one or more proposed modifications comprises identifying one or more actions that, if performed, would increase the quality score of the script.

6. The method of claim 1, wherein the one or more proposed modifications comprise a suggestion of a particular delivery mode for the produced media content in order to improve probability that the produced media content will be successful.

7. The method of claim 1, further comprising:
   training the second machine learning model to generate quality scores, wherein the training uses a set of example scripts and associated quality scores.

8. The method of claim 1, wherein the quality score is based at least in part on a number of plot devices, a timing of plot devices, types of plot devices, or combinations thereof.

9. The method of claim 8, wherein the types of plot devices include character reveals, audience reveals, reversals, or cliffhangers.

10. The method of claim 8, wherein the quality score is based at least in part on a weight associated with a segment of the script in which a plot device of the plot devices occurs.

11. The method of claim 1, wherein generating the quality score includes applying natural language processing to determine complexity of dialogue in the script.

12. A non-transitory computer-readable medium containing computer program code that, when executed by operation of one or more computer processors, performs an operation comprising:
receiving a script for producing media content;
automatically generating a plurality of tags related to content of the script, wherein the plurality of tags are generated using a first machine learning model trained to generate tags based on script elements, and wherein the script elements comprise plot devices, character types, or dialogue counts or distributions;
selecting a second machine learning model, wherein the second machine learning model is selected from a plurality of models based at least in part on a genre of the script;
generating a quality score for the script by processing the plurality of tags using the selected second machine learning model;
generating, based on the quality score and the plurality of tags, one or more modifications for the script;
outputting, via a graphical user interface, the quality score and the one or more modifications for the script;
automatically applying the one or more modifications to the script; and
automatically refining the second machine learning model based on:
a determination that the quality score is above or below a threshold,
a popularity of the media content based on the modified script,
a delivery mode of the media content, and
adjusting one or more predefined thresholds used by the second machine learning model to generate the quality score.

13. The computer-readable medium of claim 12, wherein generating the plurality of tags further comprises processing the script using one or more trained machine learning models in order to identify occurrence of one or more predefined concepts in the script.

14. The computer-readable medium of claim 12, wherein the operation further comprises receiving one or more manually-curated tags from a user, and wherein the quality score is further based on the one or more manually-curated tags.

15. The computer-readable medium of claim 12, wherein the plurality of tags indicate at least one of:
(i) presence of one or more plot devices in the script;
(ii) presence of one or more character archetypes in the script;
(iii) gender of one or more characters in the script;
(iv) a diversity of characters in the script;
(v) a number of lines associated with each character in the script;
(vi) a length of the script;
(vii) a complexity of dialogue in the script; or
(viii) a length of one or more segments of the script.

16. The computer-readable medium of claim 12, wherein the one or more modifications are generated responsive to comparing the quality score to a threshold quality score, and wherein generating the one or more modifications comprises identifying one or more actions that, if performed, would increase the quality score of the script.

17. A system, comprising:
one or more computer processors; and
a memory containing a program which when executed by the one or more computer processors performs an operation, the operation comprising:
receiving a script for producing media content;
automatically generating a plurality of tags related to content of the script,
wherein the plurality of tags are generated using a first machine learning model trained to generate tags based on script elements, and wherein the script elements comprise plot devices, character types, or dialogue counts or distributions;
selecting a second machine learning model, wherein the second machine learning model is selected from a plurality of models based at least in part on a genre of the script;
generating a quality score for the script by processing the plurality of tags using the selected second machine learning model;
generating, based on the quality score and the plurality of tags, one or more modifications for the script;
outputting, via a graphical user interface, the quality score and the one or more modifications for the script;
automatically applying the one or more modifications to the script; and
automatically refining the second machine learning model based on:
a determination that the quality score is above or below a threshold,
a popularity of the media content based on the modified script,
a delivery mode of the media content, and
adjusting one or more predefined thresholds used by the second machine learning model to generate the quality score.

18. The system of claim 17, wherein generating the plurality of tags further comprises processing the script using one or more trained machine learning models in order to identify occurrence of one or more predefined concepts in the script.

19. The system of claim 17, wherein the plurality of tags indicate at least one of:
(i) presence of one or more plot devices in the script;
(ii) presence of one or more character archetypes in the script;
(iii) gender of one or more characters in the script;
(iv) a diversity of characters in the script;
(v) a number of lines associated with each gender in the script;
(vi) a length of the script;
(vii) a complexity of dialogue in the script; or
(viii) a length of one or more segments of the script.

20. The system of claim 17, wherein the one or more modifications are generated responsive to comparing the quality score to a threshold quality score, and wherein generating the one or more modifications comprises identifying one or more actions that, if performed, would increase the quality score of the script.

* * * * *